Figure 5:
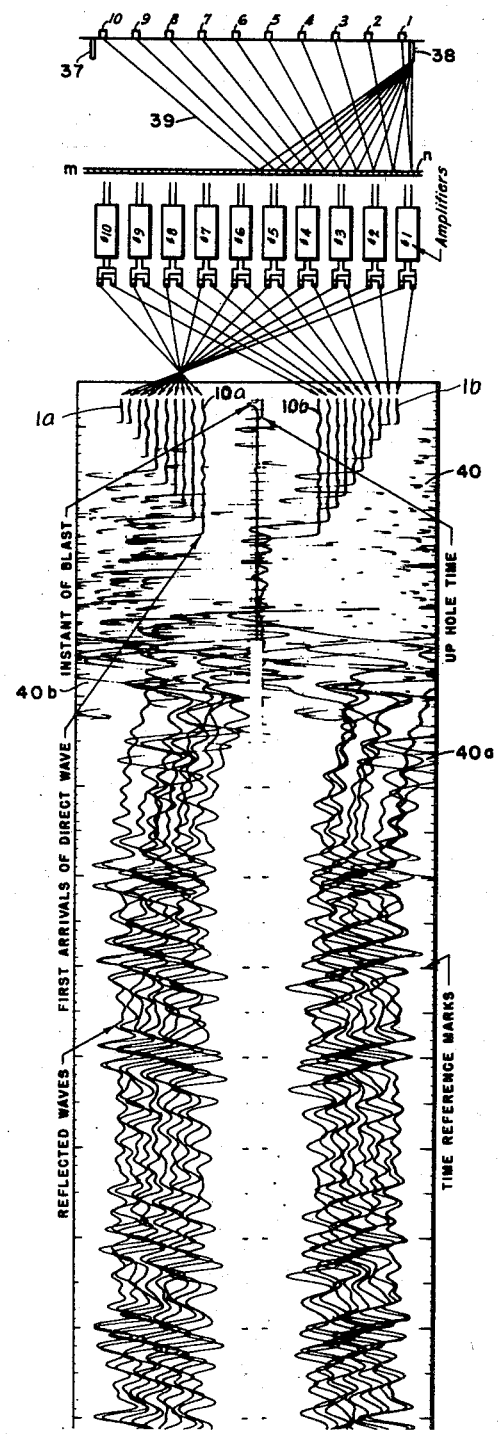

Jan. 23, 1951        L. F. ATHY ET AL        2,539,220
SEISMOGRAPHIC RECORD CORRELATION SYSTEM
Filed June 22, 1944        3 Sheets—Sheet 1
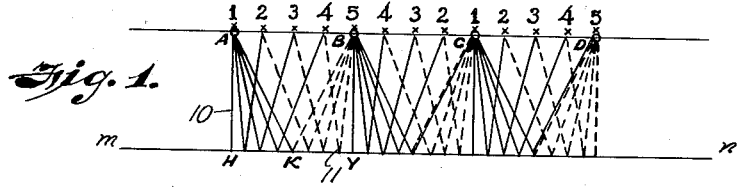
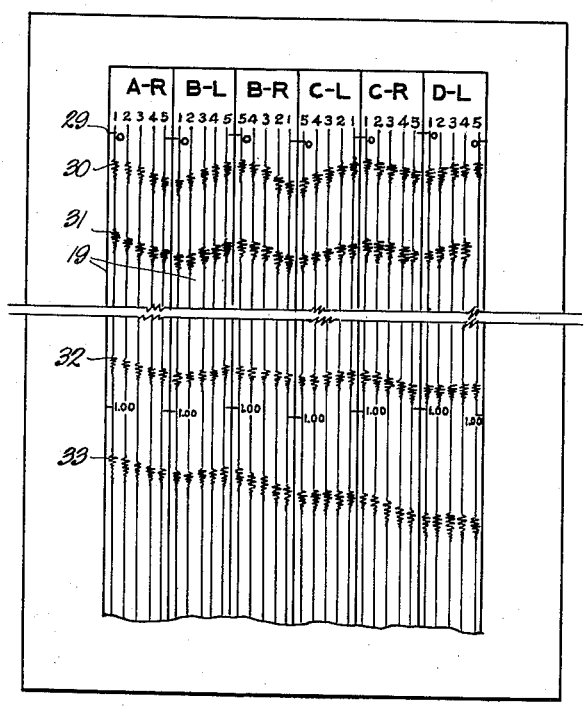
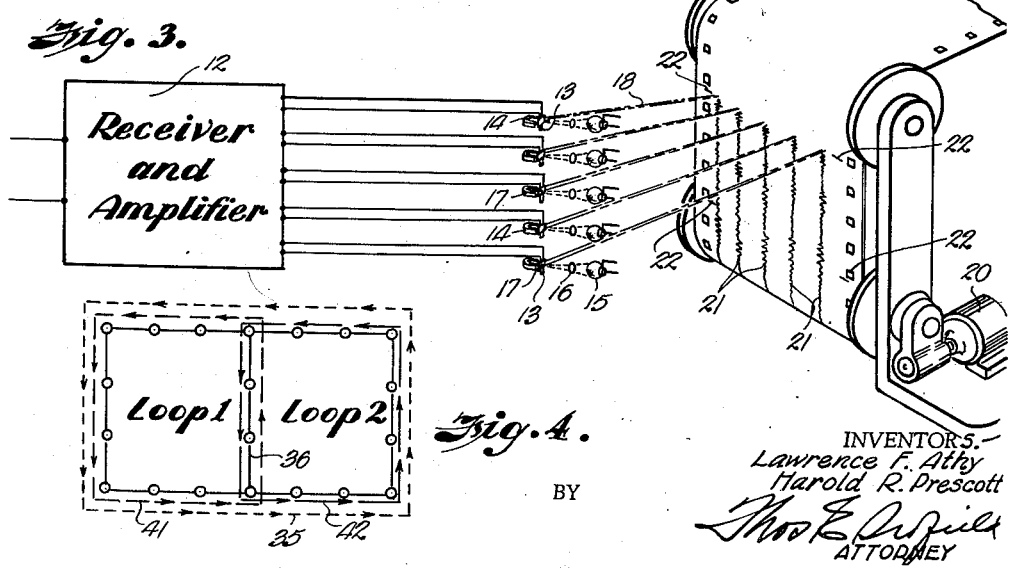
INVENTORS.—
Lawrence F. Athy
Harold R. Prescott
ATTORNEY Jan. 23, 1951 L. F. ATHY ET AL 2,539,220
SEISMOGRAPHIC RECORD CORRELATION SYSTEM
Filed June 22, 1944 3 Sheets-Sheet 2

INVENTORS.
Lawrence F. Athy
Harold R. Prescott
BY
ATTORNEY.

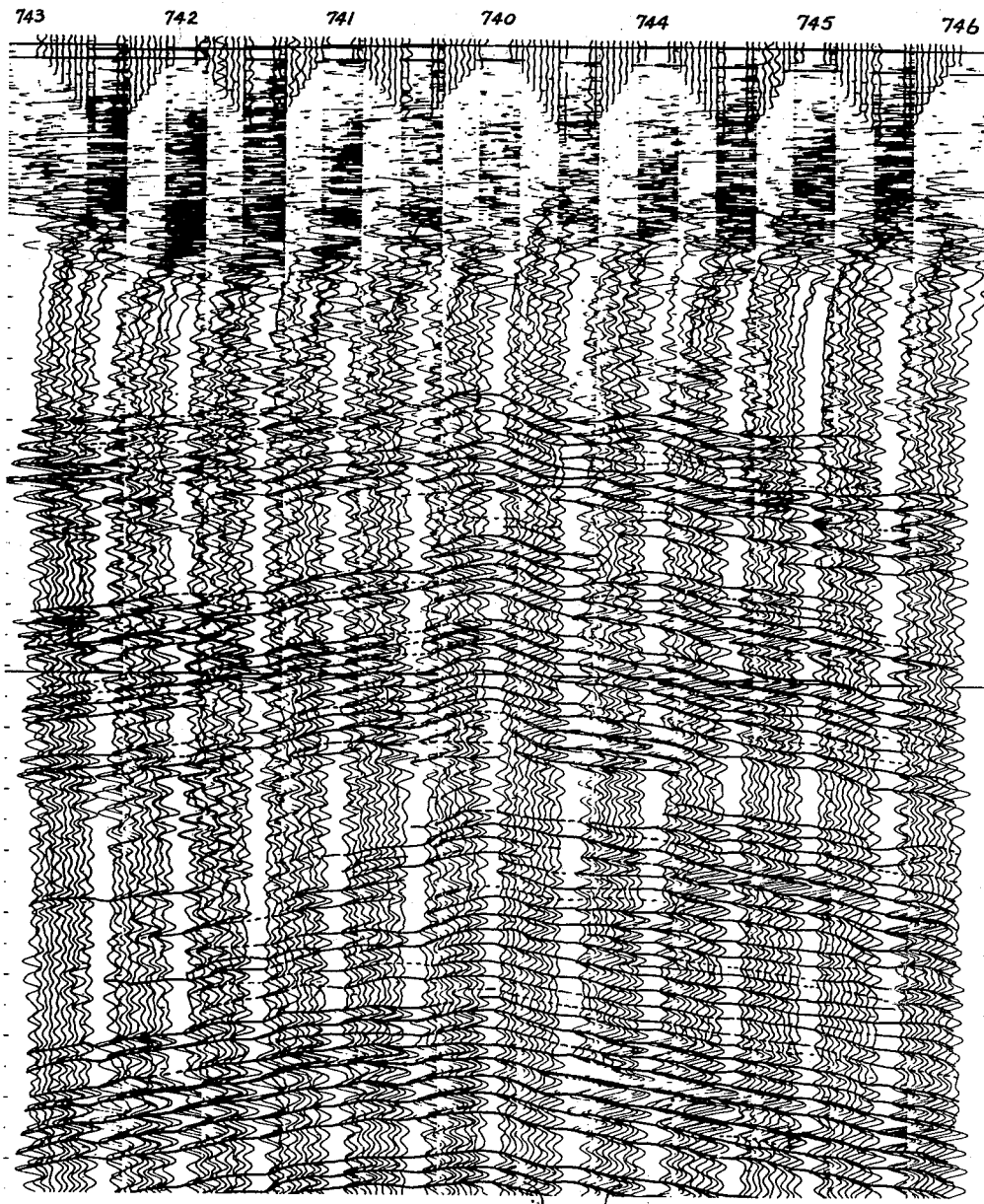

Patented Jan. 23, 1951

2,539,220

UNITED STATES PATENT OFFICE 2,539,220

SEISMOGRAPHIC RECORD CORRELATION SYSTEM

Lawrence F. Athy and Harold R. Prescott, Ponca City, Okla., assignors to Continental Oil Company, Ponca City, Okla., a corporation of Delaware Application June 22, 1944, Serial No. 541,614

8 Claims. (Cl. 181—.5)

Our invention relates broadly to new and useful improvements in the art of geophysical exploration. More particularly, our invention relates to a method of obtaining and assembling record strips produced by continuous seismic profiling methods to graphically portray a vertical section of the earth's crust along the profile being measured and to the composite assembly thus obtained.

Various methods of continuous profiling are known. Those shown and described in Patents 2,118,441; 2,158,198; 2,321,450 and 2,336,053 issued to Lawrence F. Athy and Elton V. McCollum are typical. Any of these methods can be used to produce the record strips with which the instant invention is primarily concerned.

The traces on the individual record strips depict data from which the physical characteristics and relationship of the subsurface bed between adjacent shot points can be determined. However, the distance between the adjacent shot points is usually small compared with the length of the traverse being measured. Accordingly, the information that can be obtained from a single record strip is of little value in determining the character of the entire traverse. This determination can only be made by studying a plurality of the strips and correlating the data obtained therefrom. However, when the strips are very numerous or when the traverse is exceedingly long correlation of the data becomes tedious and difficult.

We have discovered that if all of the record strips are taken with a constant speed camera they may be laid side by side in proper sequence and intelligently inspected or examined collectively. This is a great convenience and permits much more accurate deductions to be made. If the strips are properly adjusted longitudinally relative to each other to compensate for differences in the shot point levels and in the thickness of the weathered mantel overlaying the rock strata they present a visual representation or simulation of various subsurface horizons.

The character of the various horizons are more readily visualized if the reflections from the horizon interfaces are colored or otherwise accentuated on the respective strips. In order to more clearly bring out the character of the horizons along the entire traverse, it is desirable to reproduce the assembled strips. To more clearly illustrate the structural aspects a reprint on any desired scale may be made.

An important object of our invention is to provide a novel method of assembling and correlating record strips so that the data thereon can be more readily studied.

Still another object of our invention is to provide a composite seismographic record section that portrays in vertical section the actual character of the subsurface beds.

Other objects and advantages of the invention will be apparent during the course of the following description.

Figure 6:
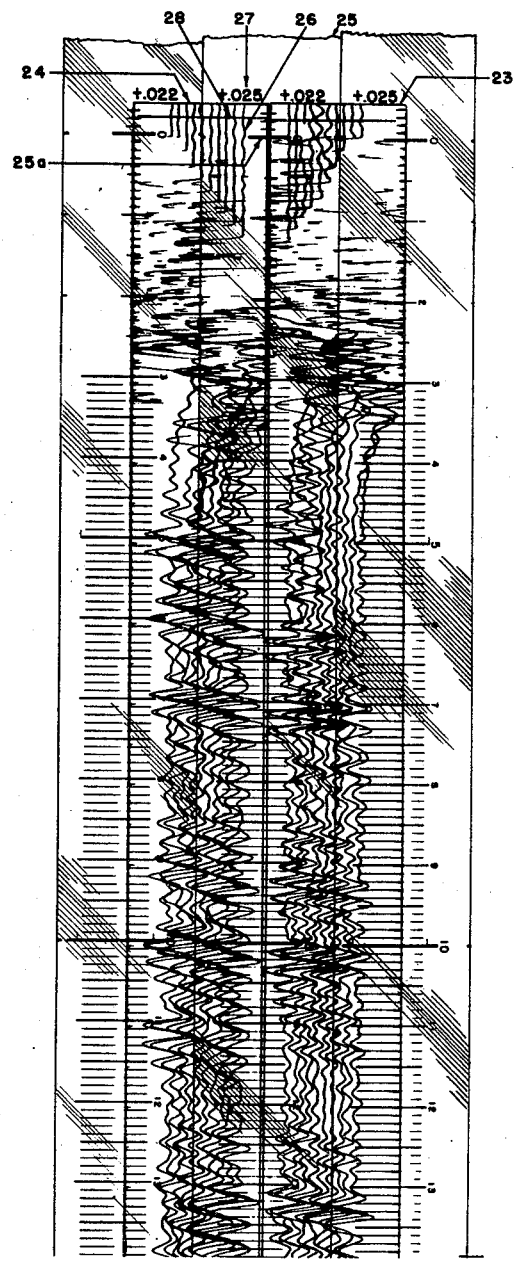

In the drawing forming a part of this specification and wherein like numerals are employed to designate like parts throughout the same, Fig. 1 is a diagrammatic view illustrating a typical method of continuous profiling by seismographic methods, Fig. 2 is a composite seismographic record section showing the manner in which the various subsurface horizons are brought out when individual record strips are assembled according to the teachings of this invention, Fig. 3 is a diagrammatic view illustrating the manner in which the individual record strips are produced, Fig. 4 is a diagrammatic view of a shot point plat showing the manner in which a continuous profile is mapped along a closed traverse, Fig. 5 is a diagrammatic view illustrating the manner in which dual records are made, Fig. 6 is a fragmentary plan view showing the manner in which adjacent record strips are assembled and matched to compensate for variances in weathering and shot point levels, and Fig. 7 is a plan view of a composite record section showing the appearance when the assembled record strips are reproduced.

As suggested, the invention can be adapted to any method of continuous seismic profiling. In Fig. 1 is shown one method that is commonly practiced. A, B, C and D represent shot points; 1, 2, 3, 4 and 5 represent seismophone positions and the line $m, n$ represents a reflecting subsurface bed. Assuming that A is the end shot point on the traverse, five seismophones are first placed at positions 1, 2, 3, 4 and 5 between shot points A and B. Shots are then made successively from point A and point B. The record strip produced when point A is shot depicts the bed $m, n$ from H to K, as shown by the full lines 10. The strip produced when point B is shot portrays the horizon from K to Y, as shown by the dotted lines 11.

The seismic waves reflected from the bed $m, n$ are received by the seismophones and translated to electrical energy. As shown in Fig. 3, the electrical waves are passed through a receiver and amplifier 12 and impressed across wire loops 13 disposed in the field of permanent magnets 14. Beams of light from lamps 15 are projected through lenses 16 onto mirrors 17 carried by the loops 14. The beams of light 18 are reflected from mirrors 17 onto a photographic film 19 moved at a constant speed by a synchronous motor 20. Changes in the seismic waves reaching the seismophones cause coils 13 to oscillate and, accordingly, to effect the appearance of traces 21 produced by the reflected light beams 18.

For the purpose of this invention all of the record strips 19 must have the same dimension between time reference marks 22. It is preferred that the strips be narrow and that they be moved at an average speed of one foot per second. Narrow strips are more easily correlated for analysis. If the strips are operated at a constant speed of one foot per second the characteristics of traces 21 denoting subsurface beds will be sufficiently spaced to be readily distinguishable. It is to be understood, however, that the record strips 19 may be of any selected dimension and they may be operated at any desired speed. It is only essential that all of the strips have the same dimension between corresponding time reference marks so that the characteristics of the traces denoting reflections from a particular bed will be in the same relative position when the strips are assembled side by side.

Referring again to Fig. 1, after the shots from points A and B have been duly recorded on record strips by the seismophones spread therebetween, the seismophones are moved to positions 5, 4, 3, 2 and 1 between shot points B and C. After shots have been taken successively at points B and C the seismophones are moved to positions 1, 2, 3, 4 and 5 between shot points C and D and the procedure repeated. In Fig. 1 we have shown four shot holes and five seismophone positions between adjacent shot holes but it should be understood that any number of shot holes and seismophone positions may be provided depending upon the nature of the investigation, the character of the terrain and other factors.

In this method of profiling the successive record strips have one common reflection path. As an illustration, path A—K—5 and path B—K—1 are substantially identical and are common to records produced from shots from hole A and hole B with the seismophones spread between these holes. The path B—Y—5 is common to records produced by the shot from hole B with the seismophones spread at positions 1, 2, 3, 4 and 5 at the left of the hole and the shot from hole B with the seismophones spread at positions 5, 4, 3, 2 and 1 at the right of the hole. These common or substantially common paths or traces on the adjacent record strips greatly facilitate matching the strips when the composite section is assembled.

In order that the corresponding reflections on the adjacent record strips be correctly matched or correlated along the entire traverse, it is necessary that each strip be adjusted to the ones next to it. The strips can be correlated either by matching time corrected for near surface variables such as differences in weathering or differences in shot point levels or by matching reflections from the respective beds. The former method is preferred since corresponding reflections are sometimes difficult to identify. Generally speaking, the "time" on a reflection record is the time which elapses from the instant of blast to the reflected event. This total time is generally not the time used in geological interpretations for the reason that it must be corrected for the weathering layer, differences of elevation, etc. The total time consists of two quantities, the corrected time and the correction value. By corrected time we mean the value which has been corrected for the local variables in order that comparisons between values may be made. Of course, the correction value is the difference between the total time and the corrected time.

A typical method of correlating record strips by matching corrected times is by means of transparent time-scale strips as shown in Fig. 6. The transparent strip is one of the same size as the record strips 19 and it has printed thereon a time scale corresponding to the time reference marks 22 recorded on the record strips. When the individual record strips are assembled the transparent time-scale strips are superposed over the traces to be computed and is arranged so that it directly indicates the corrected time.

For example, in Fig. 6 is shown two record strips 23 and 24 correlated by means of a transparent time-scale strip 25. Computing trace 26 on record strip 24 had a weathering and elevation correction of +.025 as shown at 27. Therefore, the instant of blast mark 28 on the record strip 24 was set at —.025 on the time-scale 25a of strip 25. This means when the corrected time was 1.000 second on scale 25a, for example, the total time was 1.025. From this it will be observed that the corrected time of 1.000 second will usually not be a horizontal line on the seismic record section but will occur at various positions depending upon the magnitude of the relative correction quantities.

The use of corrected times obviously saves much laborious effort, as it permits direct comparison of geological relief from point to point upon reading the corrected scales.

Fig. 2 shows diagrammatically a plurality of record strips 19 properly assembled. It will be observed that the reference "0" second marks 29 are not on a horizontal line and that the adjacent strips have been corrected for near surface variations. This figure illustrates a composite seismic record section produced by assembling the record strips obtained from a continuous traverse between shot points A and D in Fig. 1. Strip A—R is the record obtained when a shot is fired at A and recorded by seismophones spread to the right of the shot hole. Strip B—L is the record obtained when a shot is fired at B and the seismophones are spread to the left of the shot hole. Similarly the strip B—R is the record obtained when a shot is fired at B and the seismophones are spread to the right of the shot hole. The other strips are correspondingly related to shot holes C and D.

When the individual record strips are properly correlated the waves or impulses reflected from the various subsurface beds are matched, as shown at 30, 31, 32 and 33. All of the reflections can be visually traced across the section. The wave to wave or trough to trough characteristics may likewise be traced along the traverse. The convergence or divergence of reflecting horizons may be noted. Continuity or discontinuity of specific reflections are illustrated, a showing invaluable in the interpretation of seismographic records. The presence of geological faults and unconformities are readily detected from such record sections.

If the composite record section shown in Fig. 2 is large it may conveniently be reproduced on a miniature scale, as shown in Fig. 7. When studying the record section it is convenient to outline or otherwise accentuate the portions of the traces representing the various beds. The horizontal lines extending across Fig. 7 correlate reflections from the various horizons and facilitate study of the assembly.

It is sometimes necessary to make dual record strips when each shot is fired, as shown in Fig. 5. Dual record strips are required wherever continuous profiles are made along closed traverses having a common side. A situation of this character is illustrated in Fig. 4, wherein loop 1 represents one traverse and loop 2 represents another traverse. In exploring an area it is conventional practice to plot a series of shot holes in the form of a rectangle and to take continuous traverse around the rectangular section. For example, let us assume that a continuous profile was made around the perimeter of loops 1 and 2 as represented by line 35 and that the individual record strips when assembled into a composite record section did not furnish sufficient information. The usual procedure then is to shoot along a line or profile dividing the original traverse. In Fig. 4, for example, the shots would be taken along the line 36. Dual record strips must be taken along the latter profile in order that they may be properly correlated with the original record strips to produce composite record sections depicting separate closed traverses around loops 1 and 2. In order that the dual record strips be properly correlated with the record strips originally taken it is necessary that the traces on each pair of strips have like polarity and that they be arranged in transposed relation.

In Fig. 5, we have shown shot points 37 and 38 having seismophones 10, 9, 8, 7, 6, 5, 4, 3, 2 and 1 spread therebetween. When a shot is fired from shot hole 38 the waves are reflected back to the seismophones from horizon $m$, $n$, as shown by lines 39. The seismic impulses are translated to electrical impulses by the seismophones and recorded as traces on record strips in the manner hereinabove described. However, when a dual record is made the electrical impulses from each seismophone are recorded simultaneously in transposed relation on contiguous halves 40a and 40b of a common dual record strip 40. Alternatively, the record strips 40a and 40b may be separate strips operated synchronously by the motor 20. For example, the impulse from seismophone No. 1 is passed through amplifier No. 1 and recorded simultaneously adjacent the outer margins of the dual record strip 40 as traces 1a and 1b. The impulse from seismophone No. 10 is passed through amplifier No. 10 and recorded simultaneously adjacent the center line or inner margins of the dual record strip 40 as traces 10a and 10b. The impulses from seismophones 2, 3, 4, 5, 6, 7, 8 and 9 are passed through their respective amplifiers and recorded simultaneously and seriately between traces 1a—10a and 1b—10b. The electrical impulses from each of the other seismophones are similarly recorded in transposed position. The dual record strips are then separated and assembled into two sets. Each set is composed of selected strips having traces disposed in geographical sequence along the traverse being measured. One set can be assembled with the strips taken along the perimeter of loop 1 so that a continuous traverse around this loop is depicted, as shown by line 41. The other set can be assembled with the record strips taken along the perimeter of loop 2 to depict a continuous traverse around this loop, as shown by line 42.

Having thus described our invention, we claim:

1. In a method of seismographic survey comprising creating at a first location a disturbance of the earth and detecting the vibrations at a plurality of points spaced along a ground traverse from said location and recording the vibrations as separate variable amplitude traces on a uniformly moving record strip such that at any given instant the moving points which generate the several traces lie on a straight line perpendicular to the line of strip movement, and repeating the procedure at successively adjacent locations along a continuation of said ground traverse, the improvement which comprises producing simultaneously at each of said locations a dual set of said variable amplitude traces in side by side relation to form a dual record wherein the order in which the traces occur in each set, reading outwardly from a point between the two sets, is the same, separating the dual records into respective record strips and forming two groups therefrom accorded to opposing directions on said traverse, producing a composite graphic profile representation of earth structure by assembling the directionally accorded record strips in side by side traverse sequence, and superimposing time indications on and common to the adjacent matching strip edges in said composite profile adjusted to show corrected reflection time.

2. In a method of seismographic survey comprising creating at a localized source a disturbance in the earth and detecting the vibrations at a plurality of points spaced along a ground traverse from said source and recording the vibrations as variable amplitude traces with respect to time such that portions of the record aligned transversely thereof are simultaneously formed, and repeating the procedure at successively adjacent locations along a continuation of said ground traverse, the improvement comprising making dual simultaneous variable amplitude records of such vibrations with respect to time but reversing the arrangement of one relative to the other, side by side upon separate record strip members, and making composite seismic section records of the separated record strips to show thereon in continuous profile manner the seismic reflections as shown by the lateral continuity of the amplitude records by assembling the record strips in separate groups according to their geographic direction and sequence, timing indications on the edge of each strip being in exact coincidence.

3. In a method of seismographic survey comprising creating at a localized source a disturbance in the earth and detecting the vibrations at a plurality of points spaced along a ground traverse from said source and recording the vibrations as variable amplitude traces with respect to time such that portions of the record aligned transversely thereof are simultaneously formed, and repeating the procedure at successively adjacent locations along a continuation of said ground traverse, the improvement comprising making dual simultaneous variable amplitude records of such vibrations with respect to time but reversing the arrangement of one of the records with respect to the other, side by side on a strip member and producing a composite record on which the seismic reflection may be correlated and identified and from which the geographic structure may be inferred, by assembling the record strips adjacently in their relative geographic positions, adjusting said strips relative to each other to compensate for physical conditions influencing the reflected seismic waves, and superimposing transparent timing scale indication on said record strips to indicate corrected time.

4. In a method of seismographic survey comprising creating at a localized source a disturbance in the earth and detecting the vibrations at a plurality of points spaced along a ground traverse from said source and recording the vibrations as variable amplitude traces with respect to time such that portions of the record aligned transversely thereof are simultaneously formed, and repeating the procedure at successively adjacent locations along a continuation of said ground traverse, the improvement comprising making dual simultaneous variable amplitude records of such vibrations with respect to time but reversing the arrangement of one of the records relative to the other, side by side on a strip member, making a composite record on which the seismic reflections may be correlated and identified and from which the geographic structure may be inferred by assembling the record strips adjacently in their relative geographical positions, and adjusting said strips relative to each other to compensate for various physical conditions influencing the reflected seismic waves.

5. In a method of seismographic survey comprising creating at a localized source a disturbance in the earth and detecting the vibrations at a plurality of points spaced along a ground traverse from said source and recording the vibrations as variable amplitude traces with respect to time such that portions of the record aligned transversely thereof are simultaneously formed, and repeating the procedure at successively adjacent locations along a continuation of said ground traverse, the improvement comprising making dual simultaneous variable amplitude records of such vibrations with respect to time but reversing the arrangement of one of the records relative to the other, side by side upon separate record strip members, separating the record strip members, and making composite seismic section records of the separated record strips to show thereon in continuous profile manner the seismic reflections as shown by the lateral continuity of the amplitude records, by assembling the record strips adjacently in geographic direction and sequence and in accordance with the correlatable character of said records.

6. In a method of seismographic survey comprising creating at a localized source a disturbance in the earth and detecting the vibrations at a plurality of points spaced along a ground traverse from said source and recording the vibrations as variable amplitude traces with respect to time such that portions of the record aligned transversely thereof are simultaneously formed, and repeating the procedure at successively adjacent locations along a continuation of said ground traverse, the improvement comprising making two sets of simultaneous variable amplitude records with respect to time but reversing the arrangement of one of the records relative to the other, side by side on a common dual record strip member, separating the dual records, and making composite seismic section records of the individual record strips by assembling the record strips derived from adjacent locations in groups side by side in geographic direction and sequence.

7. In a method of seismographic survey by creating at a localized source a disturbance in the earth to form artificial seismic waves, producing dual simultaneous variable amplitude records with respect to time, side by side on record strip means, of the vibrations resulting from said disturbance at a plurality of points differently located relative to said source, the improvement comprising reversing the arrangement of one of the records relative to the other while forming the portions of the record aligned transversely of the strip.

8. The method according to claim 1, further characterized in that the last edge trace of a record strip is substantially identical with the first edge trace of the next succeeding record strip produced in traverse sequence.

LAWRENCE F. ATHY.
HAROLD R. PRESCOTT.

REFERENCES CITED

The following references are of record in the file of this patent:

UNITED STATES PATENTS

| Number | Name | Date |
|---|---|---|
| 946,265 | Park et al. | Jan. 11, 1910 |
| 2,024,921 | Green | Dec. 17, 1935 |
| 2,151,878 | Weatherby | Mar. 28, 1939 |
| 2,156,198 | Scherbatskoy | Apr. 25, 1939 |
| 2,156,624 | Faust | May 2, 1939 |
| 2,167,124 | Minton | July 25, 1939 |
| 2,184,313 | Owen | Dec. 26, 1939 |
| 2,191,121 | Slichter | Feb. 20, 1940 |
| 2,192,972 | Innes | Mar. 12, 1940 |
| 2,202,885 | Zuschlag | June 4, 1940 |
| 2,243,729 | Ellis | May 27, 1941 |
| 2,348,411 | Petty | May 9, 1944 |
| 2,427,421 | Rieber | Sept. 16, 1947 |
| 2,321,450 | Athy | June 8, 1948 |

OTHER REFERENCES

Pirson, "Continuous Profiling Method of Seismographing for Oil Structures," Publication 833 of the American Institute of Mining and Metallurgical Engineers, February, 1937, pages 3-9.